Feb. 4, 1958   D. B. VAN DOLAH ET AL   2,821,741
POULTRY PICKING METHOD
Original Filed Dec. 17, 1951

INVENTORS
DELOS B. VAN DOLAH
IRVIN R. LENTZ
BY
R. G. Story
ATTORNEY

United States Patent Office 2,821,741
Patented Feb. 4, 1958

2,821,741

POULTRY PICKING METHOD

Delos B. Van Dolah and Irvin R. Lentz, Chicago, Ill., assignors to Swift & Company, Chicago, Ill., a corporation of Illinois Original application December 17, 1951, Serial No. 261,998, now Patent No. 2,716,257, dated August 30, 1955. Divided and this application October 20, 1954, Serial No. 463,436

6 Claims. (Cl. 17—45)

The present invention relates to the dressing of poultry.

A principal object of the invention is the speedy removal of the feathers across the back of the birds, the back of the wings, and areas adjacent thereto.

One of the advantages of the instant method and apparatus is the thoroughness with which the picking is accomplished. Compared to the conventional practices of picking poultry, the present method and apparatus leaves the picked areas extremely clean.

A further advantage is that through the use of the instant invention the flesh of the birds in the picked areas is not damaged. Obviously damage to the birds such as occurs in many instances during picking reduces the market value of the birds.

The method and apparatus of the instant invention has the advantage that existing picking machines and conveying equipment may be converted to practice the invention with relatively inexpensive modifications thereof.

Other objects and advantages include: the small amount of hand labor involved in practicing the invention and the fact that that labor need not be skilled; the simplicity of the apparatus normally used in practicing the invention; and the necessity of adding no additional moving parts to existing picking equipment if it is desired to convert existing equipment rather than fabricate new machines.

The method we have devised for the effective picking of the backs of the birds and the back of the wings thereof is to support the birds by the necks and legs and to hold the birds so supported in contact with the flexible picking fingers of a drum type picking machine. By rotating the birds first to one side and then to the other additional areas around the wings and the sides of the birds may be cleaned.

Figure 1:
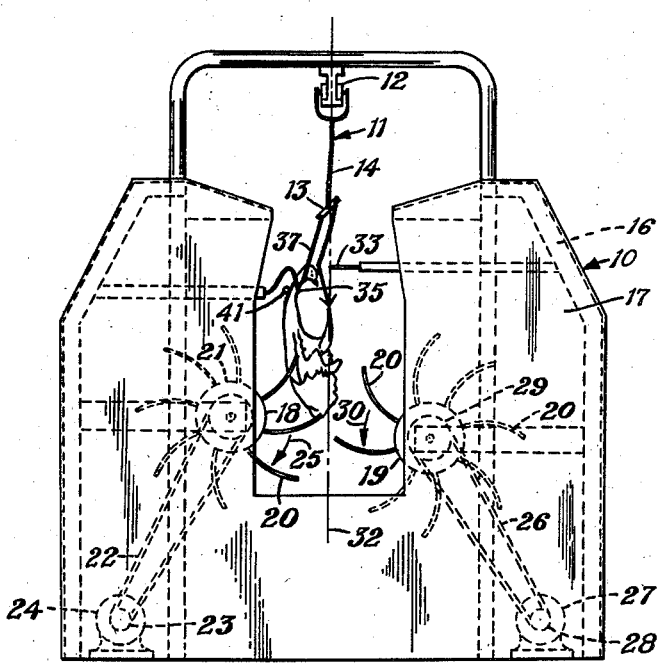
Fig. 1 is an end elevation of an embodiment of the invention.

Fig. 1 illustrates an embodiment of this concept including a flexible-fingered, drum-type picking machine generally 10 through which the individual birds are carried by supporting means generally 11. Supporting means 11 includes a power-driven overhead conveyor 12 and a neck and leg holding shackle 13 attached to the conveyor 12 by means of a chain 14. Generally speaking, various types of neck and leg holding shackles 13 may be used. We prefer to use the one illustrated and described in Patent No. 2,667,660, the disclosure of which patent is included herein by reference.

Picking machine 10 includes a frame 16 covered by a shield 17. Suitably journaled in frame 16 are a pair of picking drums 18 and 19. Each of drums 18 and 19 have a plurality of relatively long flexible picking fingers 20 attached thereto.

Drum 18 has a pulley 21 secured thereto, which pulley is connected by a belt 22 to a pulley 23 on a motor 24.

Preferably pulleys 21 and 23 are so positioned with respect to each other and to the speed of motor 24 that drum 18 will be driven at a speed of approximately 375 revolutions per minute. The direction of rotation of drum 18 is indicated by arrow 25.

Similarly, drum 19 is driven from a motor 27 by means of pulleys 28 and 29 secured respectively to the motor and drum, and a belt 30 interconnecting the two pulleys. Preferably the speed of drum 19 is about 150 revolutions per minute although some leeway may be allowed in this speed and still obtain substantially the same results. The direction of rotation of drum 19 is indicated by arrow 30.

Along the line of movement, as indicated by center line 32, of the conveyor through the picking machine is positioned a guide bar 33, the two ends of which are bent back about the ends of the slower moving drum to form a mounting means attached to frame 16. The elevation of the guide bar is such that it will contact the side of the shackle above the feet of the birds, as seen in Fig. 1.

Figure 2:
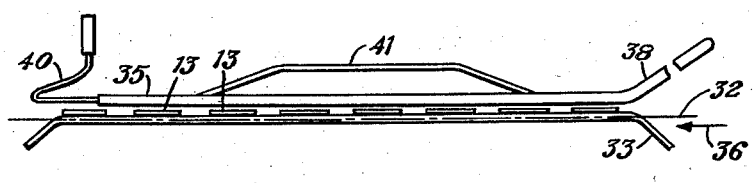
Fig. 2 is a plan view of the positioning and head pulling structure of the embodiment of Fig. 1.

At a slightly lower elevation than guide bar 33 is a spacer bar 35. The spacer bar 35 is substantially closer to the faster moving drum 18 than it is to the slower drum 19. At the entering end of the picking machine 10 (the direction of movement of the birds through the machine is illustrated by arrows 36 in Fig. 2) the guide bar extends some distance beyond the end of the drums in order to give an operator time to loop the necks of the birds over the spacer bar and secure them in a neck-holding portion 37 of shackle 13. Beyond this extension, which is indicated by the number 38, the spacer bar turns downwardly to form a mounting means connected back to frame 16.

At the exit end of the machine, the spacer bar has a re-entrant portion 40 after which the spacer bar 35 turns outwardly to form a mounting means connected to frame 16. Preferably the re-entrant portion is of smaller diameter material than is the remainder of the spacer bar and slants upwardly in the direction of movement of the birds through the machine. In the illustrated embodiment, the majority of spacer bar 35 is formed from ¾" pipe while the re-entrant portion, which forms a head puller as subsequently described, is formed of ½" rod welded to the pipe.

Attached to spacer bar 35 and spaced between the ends of the drum is an offset 41, the two ends of which are at a diagonal with respect to the spacer bar while the central portion is generally parallel thereto. This offset turns the birds as they pass through the picking machine to facilitate the cleaning thereof as hereinafter described. In the illustrated embodiment, the amount of the offset is approximately 3".

Drum 18 is set at such a height with respect to the movement of the birds along the conveyor that the ends of fingers 20 of drum 18 first strike the back of the bird in the area adjacent the base of the neck thereof (the shoulder area) and thence work down the back of the birds and the backs of the wings. The drum should not be set so high that the fingers will wrap over the birds injuring the birds and pulling the necks from the holder 37.

The slower moving drum 19 should be set at such a height that the fingers 20 of drum 19 work against the bottom of the bird to hold it into the fingers of the faster moving drum 18.

The present method and apparatus are preferably used in the processing line after the legs of the birds have been hung in the shackles and the birds have been scalded. In some installations, the birds so processed may have been passed through a slant, roughing machine before the present picking method and apparatus are employed.

As the birds so hung approach the pass along the extension 38 of spacer bar 35 the neck of the bird is lifted up and behind the extension 38 so that the bird is looped over the spacer bar 35 with both the legs and the neck hanging in the shackle 13. The shackle and the spacer bar along with the guide bar and the slower moving drum 19 form an aligning means to hold the bird in proper position for most effective picking of the shoulders and backs of the birds as well as the backs of the wings thereof. As the birds pass through the machine, the offset 41 turns the birds first one way as the neck rides up on the diagonal portion of the offset and then the other way as the neck rides down the other diagonal portion of the offset to further the cleaning of the backs of the wings and adjacent areas of the body of the bird.

As the bird leaves the picking drums, the neck is caught in re-entrant portion 40 of spacer bar 35 and the pull of the shackle on the head and feet of the birds while the neck is caught in the re-entrant portion detaches the head from the neck. At the same time, the esophagus is clamped in the re-entrant portion 40 so that the esophagus is broken adjacent the head rather than at the junction of the esophagus and the crop.

The foregoing description of a specific embodiment is for the purpose of complying with 35 U. S. C. 112 and should not be construed as imposing any unnecessary limitations upon the appended claims.

This application is a division of our prior application, S. N. 261,998, filed December 17, 1951, which is now Patent No. 2,716,257.

We claim:

1. The method of picking fowl with a flexible fingered dual drum-type picking machine to produce a stroking action, said method including the steps of supporting the fowl by the legs and the neck, subjecting one side of the fowl to said stroking action at a given rate, and simultaneously subjecting another side of the fowl to said stroking action at a lesser rate than the stroking action on said one side.

2. The method of picking fowl with a flexible fingered dual drum-type picking machine to produce a stroking action, said method including the steps of supporting the fowl by the legs and the neck, subjecting one side of the fowl to said stroking action at a given rate, simultaneously subjecting another side of the fowl to said stroking action at a lesser rate than the stroking action on said one side, and turning the fowl first in one direction and then the other to subject different portions of the fowl to said stroking action.

3. The method of picking fowl with a flexible fingered dual drum-type picking machine to produce a stroking action, said method including the steps of supporting the fowl by the legs and the neck, subjecting the back of the fowl to said stroking action, and simultaneously subjecting the lower front portion of the fowl to said stroking action at a lesser rate than the stroking action on said back.

4. The method of picking fowl with a flexible fingered dual drum-type picking machine to produce a stroking action, said method including the steps of supporting the fowl by the legs and the neck, subjecting one side of the fowl to said stroking action at a given rate, and simultaneously subjecting another side of the fowl to said stroking action at a rate substantially half as rapid as the stroking action on said one side.

5. The method of picking fowl with a flexible fingered dual drum-type picking machine to produce a stroking action, said method including the steps of supporting the fowl by the legs and the neck, subjecting the shoulders and back of the fowl to said stroking action at a given rate, and simultaneously subjecting the bottom and front portion of the fowl to said stroking action at a substantially reduced rate of speed.

6. The method of picking fowl with a flexible fingered dual drum-type picking machine to produce a stroking action, said method including the steps of supporting the fowl by the legs and the neck, subjecting the shoulders and back of the fowl to said stroking action at the rate of about 375 revolutions per minute, and simultaneously subjecting the bottom and front portion of the fowl to said stroking action at the rate of approximately 150 revolutions per minute.

References Cited in the file of this patent

UNITED STATES PATENTS

| Number | Name | Date |
| --- | --- | --- |
| 1,977,542 | Bruce | Oct. 16, 1934 |
| 2,047,544 | Bruce | July 14, 1936 |
| 2,417,890 | Staufenbiel | Mar. 25, 1947 |
| 2,502,794 | Koonz | Apr. 4, 1950 |
| 2,571,544 | Cutrera | Oct. 16, 1951 |
| 2,596,443 | Sharp | May 13, 1952 |
| 2,632,200 | Fortner et al. | Mar. 24, 1953 |
| 2,667,660 | Lentz et al. | Feb. 2, 1954 |
| 2,700,792 | Adams et al. | Feb. 1, 1955 |